United States Patent [19]

Brown et al.

[11] Patent Number: 5,183,605
[45] Date of Patent: Feb. 2, 1993

[54] METHOD FOR INJECTION INTO A SELF-CLAMPING MOLD

[75] Inventors: Robert L. Brown, Hartville; David E. Baxter, Ravenna, both of Ohio

[73] Assignee: GenCorp Inc., Fairlawn, Ohio

[21] Appl. No.: 751,353

[22] Filed: Aug. 28, 1991

Related U.S. Application Data

[63] Continuation-in-part of Ser. No. 621,675, Nov. 30, 1990, abandoned.

[51] Int. Cl.$^5$ .............................................. B29C 45/76
[52] U.S. Cl. .................. 264/40.5; 264/328.9; 425/149
[58] Field of Search ............... 264/40.5, 40.1, 328.1, 264/328.9, 328.17; 425/135, 145, 149, 595

[56] References Cited

U.S. PATENT DOCUMENTS

| | | |
|---|---|---|
| 1,935,794 | 11/1933 | Geyer. |
| 2,536,120 | 1/1951 | Beare. |
| 2,790,206 | 4/1957 | Cofek. |
| 3,005,235 | 10/1961 | Patera. |
| 3,308,508 | 3/1967 | Schrenk. |
| 3,506,755 | 4/1970 | Rudder. |
| 3,768,952 | 10/1973 | Connolly ..................... 425/451.9 |
| 3,924,995 | 12/1975 | Crooks et al. . |
| 3,973,891 | 8/1976 | Yamada. |
| 3,982,869 | 9/1976 | Eggers. |
| 4,111,623 | 9/1978 | Black. |
| 4,186,161 | 1/1980 | Ulmschneider. |
| 4,315,727 | 2/1982 | Black. |
| 4,315,885 | 2/1982 | Lemelson. |
| 4,352,654 | 10/1982 | Heimberger. |
| 4,372,738 | 2/1983 | Black et al. . |
| 4,403,810 | 9/1983 | Bieneck. |
| 4,424,015 | 1/1984 | Black et al. . |
| 4,561,626 | 12/1985 | Black. |
| 4,575,328 | 3/1986 | Fierkens. |
| 4,604,045 | 8/1986 | Black. |
| 4,671,764 | 6/1987 | Hehl. |
| 4,693,679 | 9/1987 | Marth. |
| 4,790,739 | 12/1988 | Manfredi. |
| 4,877,387 | 10/1989 | Fierkens. |
| 4,961,888 | 10/1990 | Brown. |
| 5,053,173 | 10/1991 | Sticht ................. 425/575 |

OTHER PUBLICATIONS

Frados, Plastic Engineering Handbook, 1976 pp. 445-446.
Han, Rheology in Polymer Processing 1976, pp. 284-286.

Primary Examiner—Jill L. Heitbrink

[57] ABSTRACT

A method for injecting molding material into a self-clamping mold. The method comprises the steps of supporting the mold in a support frame clamped in engagement with an injector using a lift mechanism. The pressure required to inject material into the mold is pre-determined and applied by the lifting mechanism to maintain the condition and position of self-clamping mold during injection, and is a function of the area of exposed sprue openings in the mold. The molding material is transferred into the injector. The temperature of the molding material transferred to the mold is controlled, and the molding material is injected into the mold under the pre-determined pressure using the injector, while clamping the mold within the frame with a force of less than 25 tons.

3 Claims, 7 Drawing Sheets

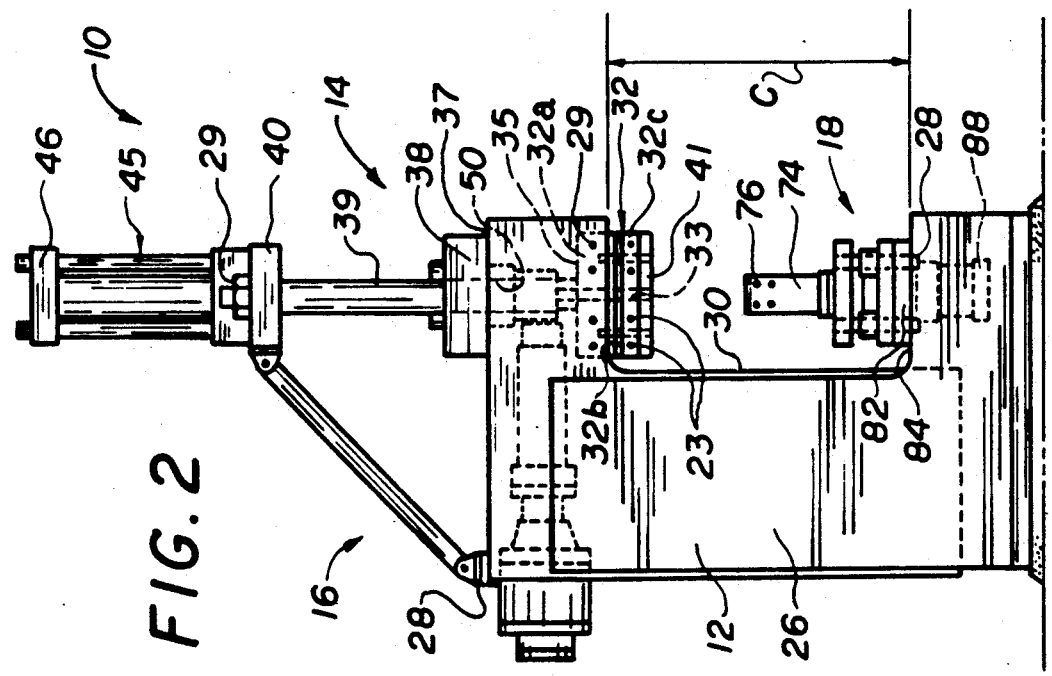

METHOD FOR INJECTION INTO A SELF-CLAMPING MOLD

This is a continuation-in-part application of U.S. application Ser. No. 07/621,675, filed Nov. 30, 1990 now abandoned.

TECHNICAL FIELD

The present invention relates to a method and apparatus for injecting molding material and more particularly to an injection method and apparatus for injecting molding material into a self-clamping mold.

BACKGROUND OF THE INVENTION

Injection molding presses for injecting molding materials into molds are well known in the manufacturing industry. Molding materials such as rubber composites, must typically be cured within their molds under specific temperature and pressure conditions. Prior to the injection of molding material into the mold, the injection press clamps the mold, such that the mold cavity is under pressure during the injection operation. After the injection of the molding material into the mold, the injection press continues to apply the necessary pressure, and perhaps temperature, to cure the molding material.

One disadvantage of conventional molding presses is that they must provide a clamping force which resists both the operating pressure externally applied to the mold during the injection of material into the mold, and a separation force internally applied to the mold as a result of the injection of material and initial curing of the material within the mold. The component of the separation force attributed to the injection of material is proportional to the cross-sectional area of the molding cavity. The clamping or resistance force required must be greater than the operating and separation forces. Thus, as the size of the product to be molded increases, the clamping force required to be applied also increases. Available injection presses provide resistance forces from approximately twenty-five tons, increasing to the necessary resistance force required for the particular application. Obviously, presses capable of applying such forces are quite substantial in size, weight and expense, as they must include support structure to maintain the mold during injection and any initial curing.

An additional disadvantage, is that the time required for each molding cycle may be six minutes or more. A molding cycle typically includes the steps of clamping the mold, injecting material into the mold, holding the mold in clamped condition to initiate curing, and recharging the injection unit with material. Such molding cycle times are required, since the molds must typically remain under pressure within the press to complete the injection operation, initiate curing, and recharge the injection unit with molding material for the next cycle.

Although some systems have attempted to reduce the length of time the molds remain in the press, these systems still require the application of significant pressure by the presses, and the time of each cycle is still relatively long. U.S. Pat. No. 3,973,891, for example, provides an injection press wherein the injection process is performed within ten seconds, and a mold tightening element is then used to maintain the mold in tightened condition during the remainder of the curing process. Once the tightening element is in place, the mold is removed from the injection press and provided to a curing station. Although the mold is not required to be maintained within the injection press for curing after injection, the injection process alone may require a period of ten seconds. The recharging process during which the injector is recharged for the next injection, further increases the total time of the molding cycle.

SUMMARY OF THE INVENTION

The present invention provides a new and improved apparatus for performing a molding process including clamping the mold within the apparatus, rapidly injecting material into a self-clamping mold, and recharging the apparatus for the next molding cycle. The apparatus is preferably designed to increase the number of molds processed in a specified time period, decrease the amount of clamping or resistance force required to resist the forces applied during the injection operation, and thereby to decrease the overall size, weight and complexity of the apparatus.

The apparatus according to the present invention includes a support frame supporting a lift mechanism, an injector and an extruder. The support frame includes spaced plates and support bars interconnecting the plates, and a C-shaped opening formed in each of the plates for receiving the mold. Supported by the frame are a fixed upper platen assembly and the vertical lift mechanism having a movable lower platen. Both platens are for engagement with the mold. Either or both of the upper and lower platens may be heated to provide additional temperature control of the molding material. The fixed upper platen assembly preferably includes a bolster plate, insulation plate, heated platen and a runner plate. During the injection operation, the mold is maintained within the C-shaped opening formed in the support frame, aligned with the injector.

The injector provided includes an injection cylinder and an injection nozzle, and is also supported on the frame for injecting molding material into the self-clamping mold under pressure. During injection of the molding material, the injector nozzle is engaged with the runner plate of the upper platen assembly in communication with the mold, and the injection cylinder may apply an injection pressure of up to approximately 25,000 psi.

The vertical lift mechanism and fixed upper platen assembly are also in clamping engagement with the mold. The lift mechanism provides a clamping or resistive force to maintain the mold clamped against the runner plate, the lift mechanism lower platen and the nozzle of the injector. The lift mechanism applies a clamping force which is greater than the forces created by the injection material in the runner, the injection force, which tries to separate the mold from the runner plate.

In conventional molding techniques, the mold is not itself under pressure, or not pre-loaded. The injection press applies the necessary forces. Using such conventional techniques, the cross-sectional area of the entire mold cavity is exposed, and the clamping force required due to the injection force component of the separation force is transferred by the mold body to the press. Since the mold components forming the cavity in the self-clamping mold of the present invention are under pressure or pre-loaded, the injection force component of the separation force of the present invention is contained by the mold. Only the runner and the sprue openings to the molding cavity in the self-clamping mold are required to be contained or clamped by the lift mechanism.

Material is provided to the injector by the extruder, which plasticizes rubber strips fed to the extruder and supplies desired quantities of molding material at desired temperatures, pressures and speeds. Molding material is preferably supplied by the extruder at a higher pound per hour rate than the rate of extrusion normally associated with injection molding. At a higher extrusion rate, the time required to recharge the injector with molding material for the next molding cycle can be very small, for example, approximately 6 seconds. A shut-off valve is provided between the injection cylinder and injection nozzle to prevent the discharge of material via the nozzle as the injector is recharged. A closed loop hydraulic unit is preferably provided to operate the lift mechanism, injector, extruder and shut-off valve.

Temperature control regulators, in addition to the temperature controlled upper and lower platens, are also provided for sensing, heating, and thereby controlling, the temperature of the molding material being injected. The temperature control regulators include jackets surrounding the injector and the extruder for controlling the desired temperature range and flow rates of the molding material.

A control system is also provided for either automatically or manually controlling the molding cycle, and preferably includes a programmable computer. The control system may thus be provided with the desired data for the molding cycle, as well as feed back data provided to the system concerning operating conditions of the apparatus.

The apparatus of the present invention may also include a transport system for supplying self-clamping molds into aligned position within the support frame C-shaped opening for engagement with the upper and lower platens and injector. Such transport systems may be of either the linear or rotary type loading conveyor with multiple mold stations.

Safety switches and other sensors are also preferably provided for recognition of mold location to prevent undesired movement of the mold, the application of pressure to the mold by the lifting mechanism, and the injection operation. In the event desired predetermined pressure, temperature and other apparatus operating conditions are not satisfactorily provided to the control system prior to the initiation of injection, the safety switches and other sensors operate to detect and prevent operation of apparatus components. Additionally, a manual safety switch is also provided to enable the operator to prevent operation of the apparatus.

Other features and advantages of the present invention will become apparent from the following detailed description of preferred embodiments made with reference to the accompanying drawings, which form a part of the specification.

BRIEF DESCRIPTION OF THE DRAWINGS

FIG. 2 is a schematic side view of the apparatus illustrated in FIG. 1;

FIG. 3 is a schematic front view of the apparatus illustrated in FIG. 1;

DETAILED DESCRIPTION OF THE PREFERRED EMBODIMENT

Figure 1:
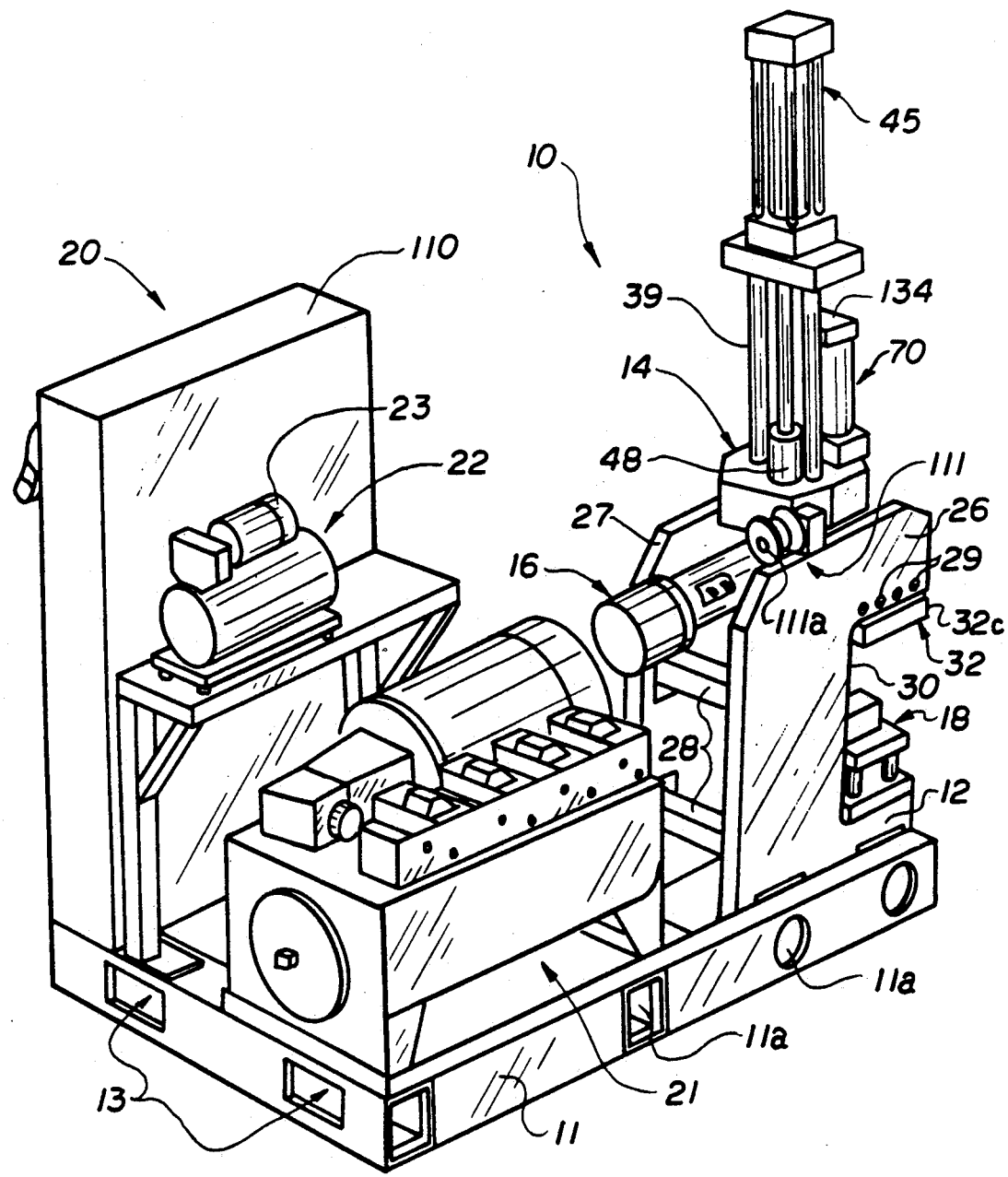
FIG. 1 illustrates a schematic perspective rear view of an apparatus for injection molding material in accordance with the present invention.
Figure 1B:
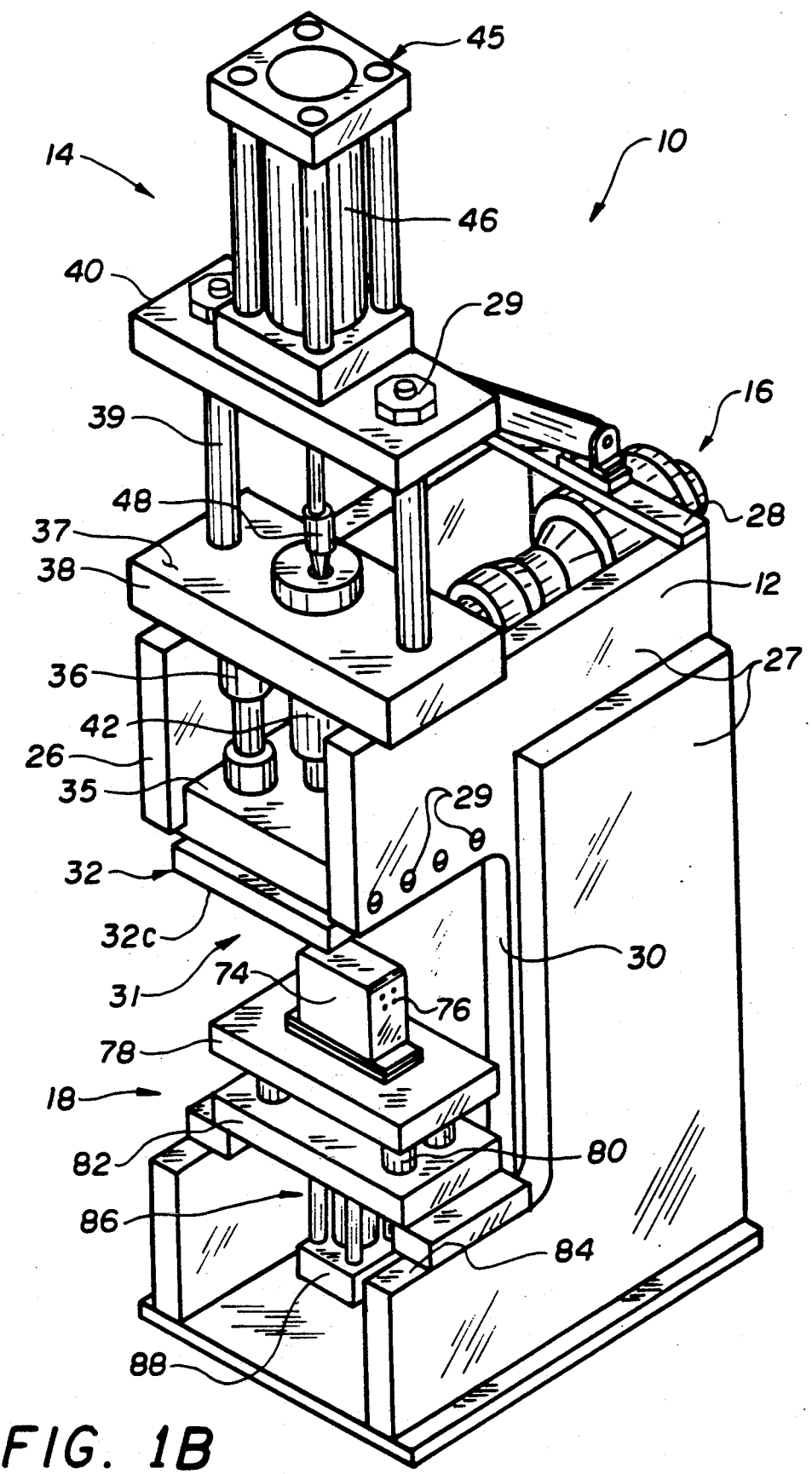
FIG. 1B illustrates a schematic perspective front view of an apparatus for injecting molding material in accordance with the present invention.

Referring now to FIGS. 1, 1B, 2 and 3, an apparatus is illustrated for injecting molding material M into a self-clamping mold S, as set forth in the present invention. The apparatus, generally referred to at numeral 10, includes a base frame 11 of metal support beams for attaching and supporting each of the components of the apparatus during transportation to other locations. Openings 11a are provided in the metal support beams to access attachments between the apparatus and base frame 11. Transportation ports 13 are provided within the metal support beams so that a fork lift may be used to transport the apparatus between desired locations.

A support frame 12 supports an injector 14, an extruder 16 and a lift mechanism 18. A control system 20 for controlling position and movement of the self-clamping molds S through the apparatus 10 and the injection operation, are also included. The control system 20 includes a programmable computer having an operator control panel, and a hydraulic unit 21 which activates various aspects of the apparatus 10 during operation. Temperature controllers 22 are provided for regulating the temperature of the molding material M within the injector 14 and extruder 16. As further illustrated in FIGS. 4, 5 and 6, a transport system 24 may further be provided for moving the self-clamping molds S through the apparatus 10.

The Apparatus

The support frame 12 of the apparatus 10 illustrated includes metal support plates 26, 27 and support bars 28 interconnecting the plates. The support frame 12 supports the injector 14, extruder 16 and lift mechanism 18, and is designed to maintain the mold under the application of as much as 25,000 psi. C-shaped openings 30 are provided in each of the plates 26, 27 and form an opening 31 for positioning the self-clamping mold S within the support frame 12. In the illustrated embodiment, a clearance C of approximately 21 inches is provided between the upper and lower legs of each of the C-shaped openings 30. It will be understood by one of ordinary skill in the art that the present invention may be adapted to inject a variety of molding materials for molding items having a variety of different sizes and shapes. Although an example of a preferred form of the present invention will be discussed in detail, one of ordinary skill may adapt the present invention for the molding of larger and/or different items by changing the relative size of the invention components as may be necessary to accommodate the injection of material for such items desired to be molded.

An upper fixed platen assembly 32 is secured by conventional fasteners 29 between the support plates 26, 27. The upper fixed platen assembly 32 includes an upper bolster plate 32a, an insulation plate 32b, a heated platen 32c and a runner plate 41. The fixed platen assembly 32 is secured adjacent to and engaged with an upper portion of the C-shaped openings 30. The upper bolster plate 32a, upper heated platen 32c and runner plate 41 of the fixed platen assembly 32 are metal plates. The insulation plate 32b is preferably of an insulating or refractory material. Each of the bolster plate 32a, insulation plate 32b, upper heated platen 32c and runner plate 41, have a central opening 33 for permitting access by the injector 14 for engagement with a top portion T of the self-clamping mold S. A flange 32d is provided on the upper bolster plate 32a for engagement with the C-shaped openings 30 of the spaced plates 26, 27, to resist vertical movement of the upper fixed platen assembly 32 out of engagement with the C-shaped openings. In the preferred embodiment of the illustrated invention, the bolster plate 32a and upper heated platen 32c of the fixed upper platen assembly 32 include conventional heaters 23 of approximately 460 volts to assist with heating of the mold and molding material to the desired temperature and flow rate.

A top surface 35 of the upper bolster plate 32a is engaged with vertical support bars 36, which are also engaged with a metal injector support member 38. The injector support member 38 is engaged on and supported by the vertical support bars 36. The vertical support bars 36 may be rigid metal support bars, or alternatively, may be spring biased to provide further adjustment and preloading of the mold S when engaged with the injector 14. Engaged on a top surface 37 of the injector support member 38 are additional vertical injector supports 39. The upper injector supports 39 are secured via additional conventional fasteners 29 to a metal cylinder support member 40 which is spaced above the injection support member 38 and parallel thereto.

The injector 14 is supported on the upper bolster plate 32a, injector support member 38 and cylinder support member 40. The injector 14 includes an injector unit 42 having a nozzle 43, a nozzle holder 44 and an injection cylinder 45. The injection cylinder 45 is supported on the cylinder support member 40, and comprises a conventional hydraulic cylinder 46 which actuates a ram 48 for injecting molding material M into the self-clamping mold S.

The injector unit 42 has an internal cavity 50 to which a charge of molding material is supplied by the extruder 16. The internal cavity 50 holds a charge of approximately 160 cc of molding material in the illustrated embodiment, however, larger or smaller volume internal cavities in the range from 5 cc to over 500 cc's, may be used in the event the item to be molded is of a larger or smaller volume. Once the internal cavity is filled with material, the hydraulic cylinder actuates the ram 48 to inject material to the mold S via a passage 49 in the nozzle holder 44 to the nozzle 43, at a rate of approximately 40 cc per second, in the preferred embodiment. The predetermined pressure at which the injection cylinder injects material into the mold is determined based upon, for example, the type and temperature of the molding material and the size of an internal mold cavity 52 within the self-clamping mold S. It should also be understood that in the event a larger internal mold cavity is used, a larger injector and hydraulic cylinder would be necessary to maintain the volume and rapid rate of injection described.

As set forth above, in the past when molding material was injected, and the mold was clamped within the injection press under an external clamping force to overcome the internal mold separation force and initiate curing of material within the entire mold cavity. The internal separation force of the mold was due to internal operating forces applied during the injection of material and curing forces due to the reaction of the material upon initial curing. As prior art molds were exposed or open and not self-clamping or pre-loaded, the required clamping force had to be maintained during curing of the entire item being molded. Additionally, the clamping force applied was calculated to overcome a separation force based upon the injection pressure and cross-sectional area of the entire open internal mold cavity of a mold.

Figure 2B:
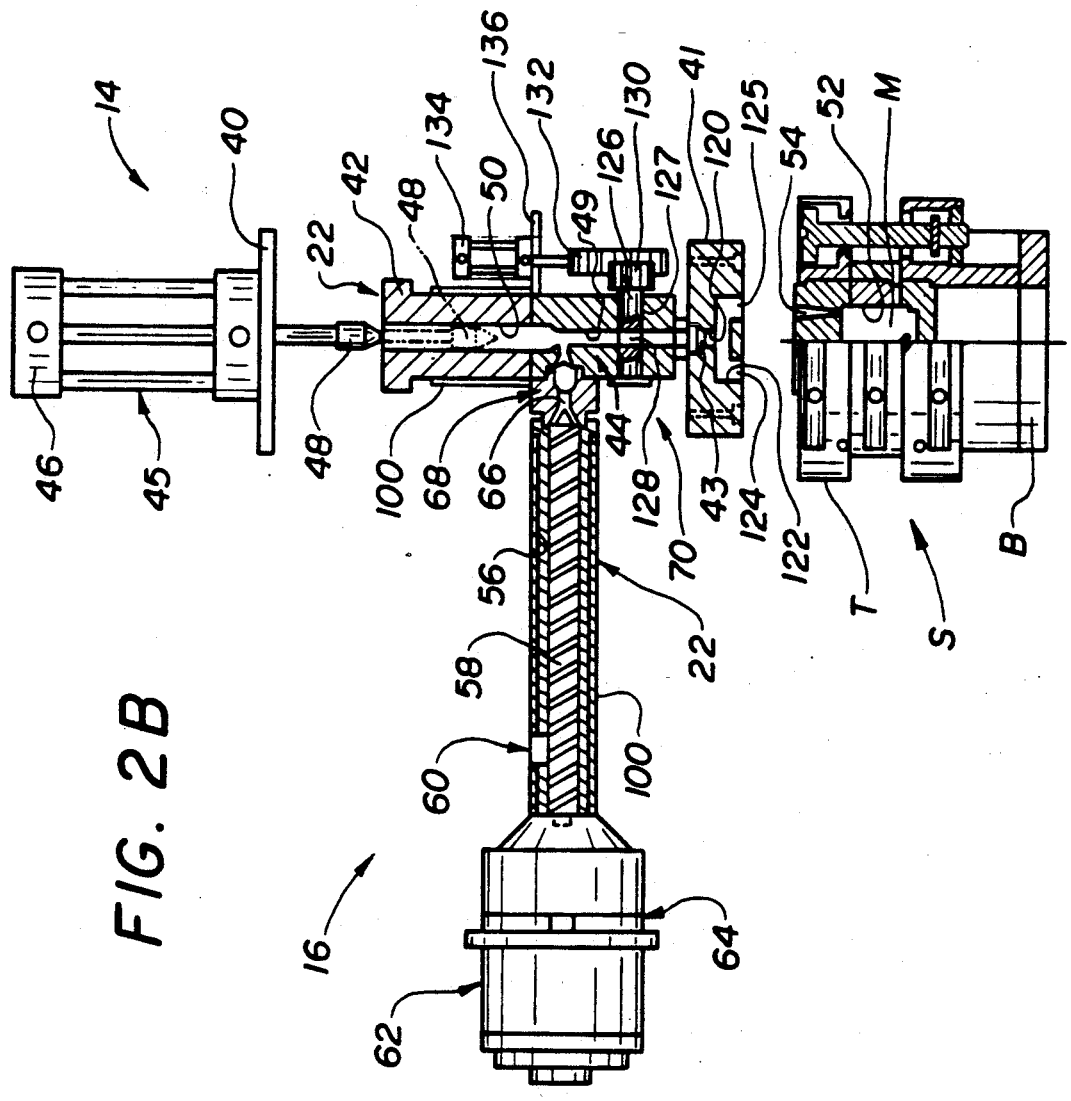
FIG. 2B is a schematic partial, cross-sectional view of the injector of the apparatus illustrated in FIG. 2, together with a partial, cross-sectional view of a self-clamping mold.

The apparatus of the present invention does not require a large clamping force during the molding cycle, since the mold is self-clamping and the separation force applied to the mold is contained by the mold itself. Thus, only areas of the mold which are open and not preloaded or under pressure, must be clamped or contained. Molding material is injected using the present invention into a self-clamping mold S having, for example, an internal mold cavity 52 having a cross-sectional area of 4.5 inches, and a maximum sprue cross-sectional area of 1 square inch, as shown in FIG. 2B. The externally applied operating force component of the separation force is calculated according to the injection pressure multiplied by the cross-sectional area of any runner and/or sprue openings 54, or other external areas, or areas which are not preloaded, and which are exposed to the injection pressure on the self-clamping mold S. Since the sprue openings 54 are smaller than the preloaded internal mold cavity, and the separation forces are contained by the mold, the necessary clamping forces are substantially reduced. The clamping forces are reduced by a factor typically of 4, such that the lifting mechanism engages the mold with a pressure which is ¼ of the pressure which would be required without a self-clamping mold to the cross-sectional area of the entire internal molding cavity 52. Not only are the clamping forces reduced, but the time the mold remains under pressure to initiate curing is reduced, since curing need not be completed in the preloaded mold cavity, but only in the exposed sprue openings 54.

As shown in FIG. 2B, during the injection operation using the present invention 10, the nozzle 43 is engaged in a sealing relationship with the runner plate 41 covering and sealing sprue openings 54 of the self-clamping mold S. The conventional runner plate 41 forms a part of the upper fixed platen assembly 32, and includes a single opening 120 for engagement with the nozzle 43, leading to a second passageway 122 having openings 124, 125. The openings 124, 125 engage or cover a plurality of sprue openings 54 in the self-clamping mold S, such that the charge of molding material is injected to the cavity 54 via the nozzle 43 and runner plate openings 120, 124 and 125, to the sprue openings 54. The apparatus 10 typically applies an injection pressure of between approximately 14,000 psi to 23,000 psi.

Again referring to FIG. 2B, the extruder 16 of the illustrated preferred embodiment is an L-type device. The extruder 16 includes a barrel 56 with a single extruder screw 58 located within a housing 59 within the barrel. An opening 60 is provided in the extruder barrel 56 for feeding strips of molding material into the barrel. In the preferred embodiment, the strips of material have a durometer hardness of 35-60, and are approximately 2 inches wide and 0.5 inches thick.

The extruder screw 58 is driven by a conventional hydraulic motor 62, which is secured to the extruder barrel 56, and interconnected with the screw via a motor coupling 64. In the preferred embodiment of the present invention, the extruder 16 has a plasticizing rate of approximately 120 pounds per hour. This high plasticizing rate enables rapid recharge of the injector, and thereby permits injection of an increased volume of material. The increased rate of material supplied by the extruder enables the internal mold cavity 52 to be filled by the extruder at a rate at least three times greater than a conventional extruder, or at least as great as three times per minute.

The extruder screw 58 supplies molding material to a supply passage 66 within the nozzle holder 44 of the injector 14, and then to the passage 49 within the nozzle holder in communication with the nozzle 43. The extruder 16 supplies a predetermined measured amount of the molding material into the injector unit 42. A check valve 68 is positioned within the nozzle holder 44 intermediate the supply passage 66 and the nozzle 43 along the passage 49, such that molding material M is prevented from passing back into the extruder 16 during the injection of molding material into the self-clamping mold S.

Additionally, a shut-off valve 70 is positioned intermediate the nozzle 43 and the passage 49, below the check valve 68, such that molding material is prevented from passing to the nozzle 43 during recharging of the internal cavity of the injector unit with molding material. The shut-off valve 70 has a rotatable cylinder 126 housed within an opening 127 within the nozzle holder 44, and a flow passage 128 through the cylinder for alignment with the nozzle holder passage 49 during the injection of molding material, as shown in FIG. 2B. The cylinder 126 has a gear wheel 130 mounted externally of the nozzle holder 44. The gear wheel 130 is engaged with a rack 132. The rack 132 is engaged with and actuated by an hydraulic cylinder 134 supported on a valve support plate 136 secured to the injector 14.

During the recharge portion of the molding cycle, the gear wheel 130 is rotated by the hydraulically actuated rack 132 to rotate the cylinder 126 to a position wherein the flow passage 128 is out of alignment with the nozzle holder passage 49. In this unaligned position, the shut-off valve 70 prevents molding material from flowing through the nozzle holder passage 49 as the injector unit 42 is recharged.

The vertical lift mechanism 18 of the apparatus 10 of the present invention includes a vertically movable mold support or lower platen 74 for engaging a bottom portion B of the mold S, and vertically moving the top mold portion T into engagement with the runner plate 41 of the upper fixed platen assembly 32 in communication with the nozzle 43. In the preferred embodiment of the invention illustrated in FIGS. 2 and 3, the mold support 74 includes conventional heaters 76 of approximately 460 volts to assist with heating of the mold and molding material to the desired temperature and flow rate. The metal mold support 74 is secured by conventional fasteners to a mold support member 78. The mold support member 78 is supported by and engaged with vertical support bars 80, which are also engaged with a metal cylinder support member 82. The metal cylinder support member 82 is secured to and engaged with flange members 84 secured to a lower portion of each of the C-shaped openings 30.

A lifting cylinder 86 is supported on the cylinder support member 82, and comprises a conventional hydraulic cylinder 88 which is secured to an attachment fixture 90 engaged with the mold support member 82 for vertically raising the mold support 74. In the preferred embodiment, the lifting cylinder 86 has a stroke distance of approximately 2 inches, and is capable of applying a resistive force of approximately 12 to 25 tons in the present example, to resist the external forces applied to the mold during the injection operation. It should be understood that the lifting cylinder may apply a force in any amount necessary to resist the external forces applied. The lifting speed of the lifting mechanism 18 of the preferred embodiment has a maximum of approximately 12 inches per second. With this lifting speed and stroke distance, the lift mechanism 18 engages or disengages the mold S from the runner plate 41 and nozzle 43 in a maximum time of approximately 0.2 seconds.

As set forth above, temperature controllers 22, including the upper and lower platen heaters 23, 76, respectively, are provided for regulating the temperature of the mold S engaged between the heated upper platen assembly 32 and heated mold support 74. Temperature controllers 22 are also provided to regulate molding material M temperature and flow rate within the injector 14 and extruder 16. In FIG. 1, the temperature controller 22 has a conventional thermal medium regulator 23 with a drive motor for controlling the temperature of the regulator jackets 100.

As shown in FIG. 2B, temperature regulator jackets 100 are provided surrounding the injector unit 42 and the extruder barrel 56. The regulator jackets 100 are preferably thermal media devices of the oil-type, with water-type heat exchangers in fluid communication with the regulator 23. Such jackets 100 control the temperature in single zones such as the extruder barrel, internal injection cavity and nozzle holder. The temperature range provided by the controllers 22 is approximately 275-400 degrees Fahrenheit, however, the preferred range is typically between 330-350 degrees Fahrenheit. Sensors are preferably provided within the jackets to provide feed back control of the controllers 22 and regulator 23 via the control system 20.

Figure 4:
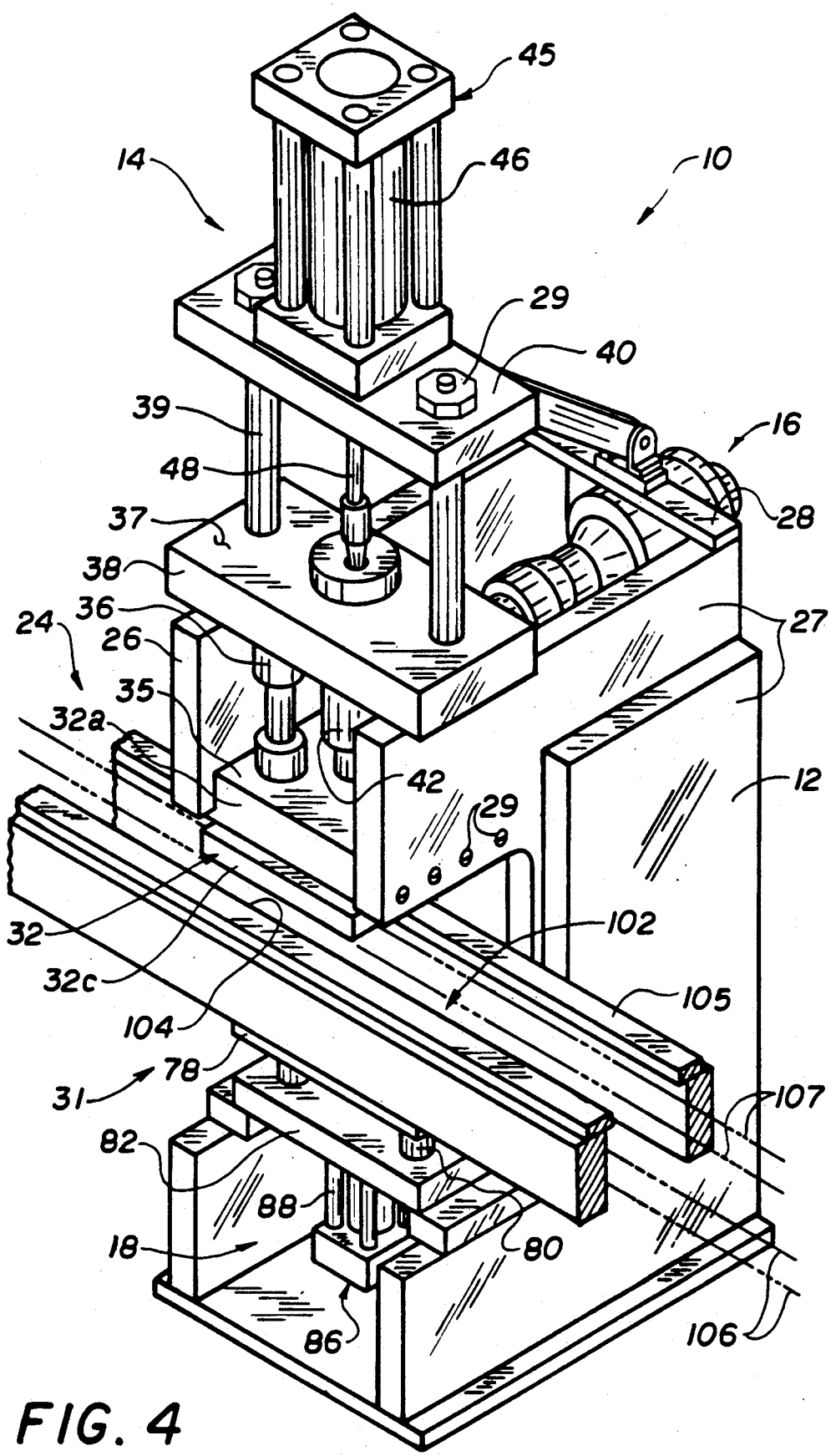
FIG. 4 illustrates a schematic perspective view of an apparatus for injecting molding material as in FIG. 1, having a transport system for supplying molds to the apparatus.
Figure 6:
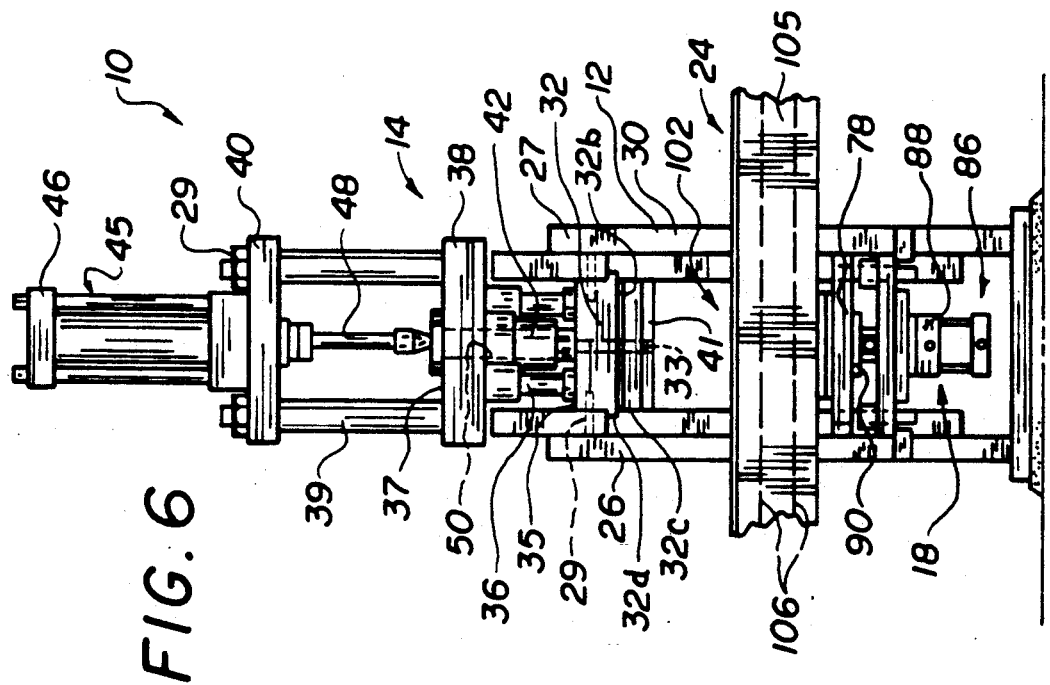
FIG. 6 is a schematic front view of the apparatus illustrated in FIG. 4.
Figure 5:
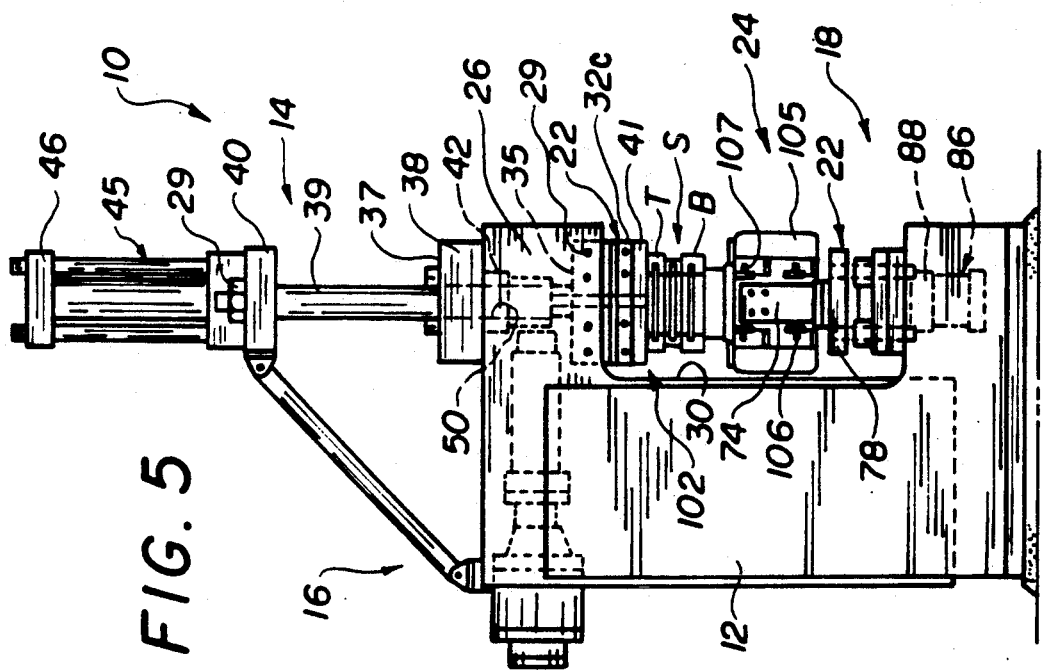
FIG. 5 is a schematic end view of the apparatus illustrated in FIG. 4 and with a mold illustrated within the apparatus.
Figure 7:
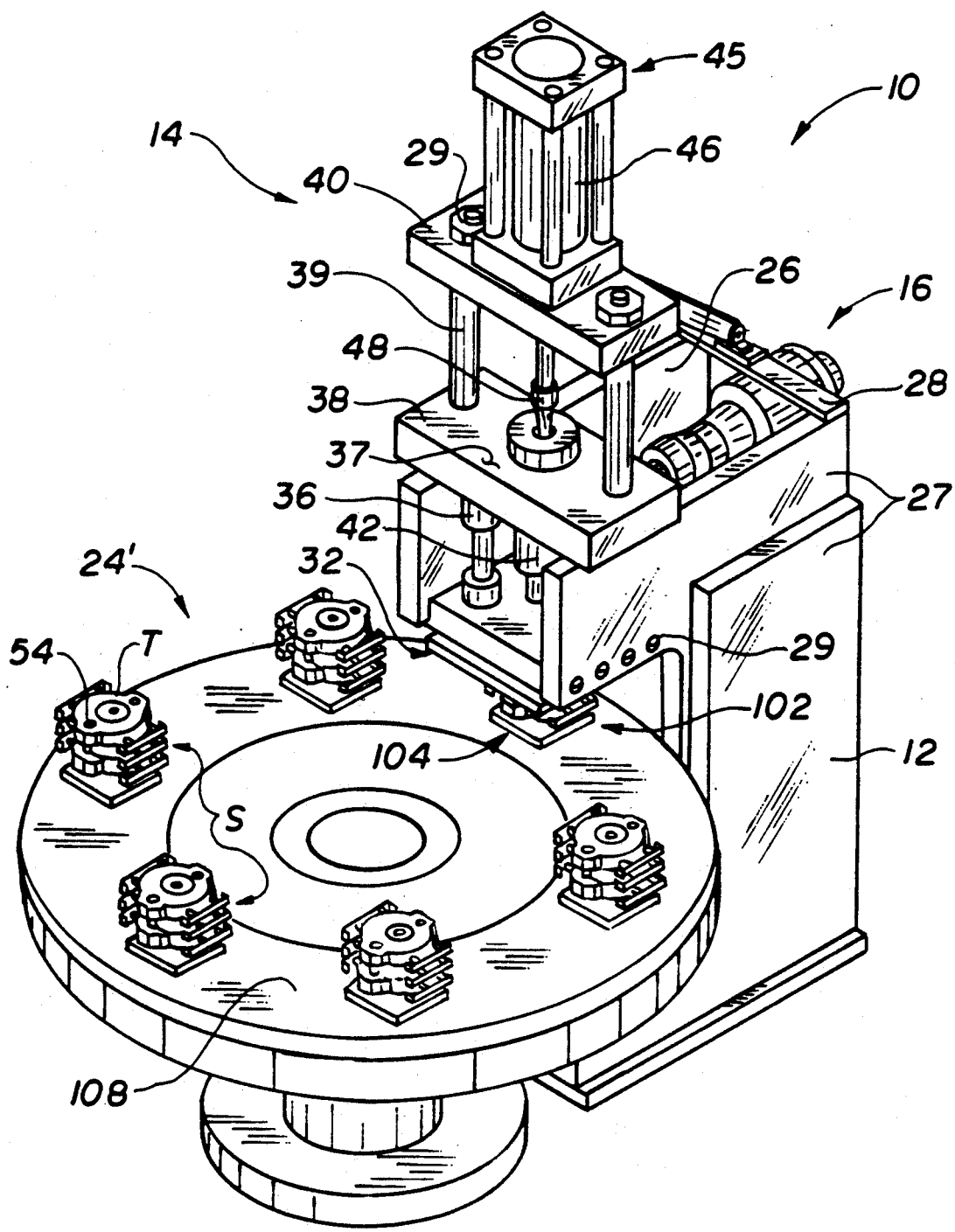
FIG. 7 is a schematic perspective view of an apparatus for injecting molding material having an alternate embodiment of a transport system for supplying molds to the apparatus.

Turning now to the transport system 24 illustrated in FIGS. 4, 5 and 6, the molds S may be provided to position in vertical alignment for engagement with the runner plate 41 and/or injector nozzle 43 by a variety of methods, including manually providing the molds to and from the mold support 74. The embodiment of the transport system, shown in FIGS. 4, 5 and 6, illustrates an automatic conventional continuous linear conveyor system 24. A second automatic alternate embodiment of the transport system is shown in FIG. 7, and is illustrated as a conventional rotary table system 24'. As elements of the transport systems 24, 24' are similar, each of the elements of the second system 24' will be referred to with a prime designation, and only the differences between the systems will be discussed in detail.

Each of the transport systems includes a molding station 102, 102' wherein the self-clamping molds S are positioned in alignment under the injector 14 during the injection operation. At the molding station 102, 102' an opening 104 is provided beneath the bottom portion B of the mold S, such that during operation of the apparatus, the mold support 74 may be vertically raised to engage and lift the mold into engagement with the upper platen assembly 32 and runner plate 41 with nozzle 43. Transport system 24 includes a continuous chain linear conveyor system 105. The mold is supported on two spaced and synchronized chains, illustrated in FIG. 5 and schematically illustrated in FIG. 4 at reference numerals 106 and 107, for movement to the molding station 102.

In the second embodiment of the transport system 24', molds are located at spaced intervals surrounding a round table 108. Openings 104' are provided under each mold positioned on the table to permit engagement of the mold support 74 with the mold as the table 108 rotates into engagement with the support frame 12. Once the injection operation is completed, the transport systems 24, 24' are used to transfer the molds to a next station.

In the preferred embodiment of the apparatus 10, the control system 20 of the present invention is programmable to control all aspects of operation of the injector 14, extruder 16, lifting mechanism 18, and temperature controllers 22, coordinated with movement of the molds manually or via a transport system 24 into position for the injection operation. The control system includes the main electric power supply (not illustrated) for the apparatus 10. Additionally, the control system includes an hydraulic unit 21 which actuates the extruder 16, check valve 68, shut-off valve 70, the lifting cylinder 86, and the injection cylinder 45, during operation of the apparatus 10. The hydraulic unit 21, is a conventional closed loop flow and valve system having a maximum pressure of 2500 psi. Pressure and temperature safety switches are also provided.

The control system 20 further includes a conventional programmable computer 110 for programming predetermined desired settings and operating conditions for operation of the apparatus 10, and a control panel 112 for use by the operator during daily operation of the apparatus. In the preferred embodiment, the operator control panel 112 is a Cincinnati-Electro System 4045, which controls and sets up all apparatus functions, including activation of the automatic cycle, however, the control panel may be any one of a number of commercial operator-interface stations. Safety switches and sensors are also preferably provided in connection with the control system, for preventing undesired movement of the mold S, the application of pressure to the mold by the lifting mechanism 18, and the injection operation. For example, a sensor 111 having a roller 11a for determining extruder speed, is provided to ensure operation of the extruder 16 is maintained as desired. In the event desired predetermined pressure, temperature and operating conditions are not satisfactorily provided to the control system 20 prior to the initiation of, or during, the injection operation, such safety switches operate to prevent operation of apparatus. Additionally, the operator control panel 112 includes a manual safety switch D to enable the operator to shut the apparatus off.

Operation of the Apparatus

Prior to operation of the apparatus 10, the operating control parameters of the item desired to be molded are programmed into the control system 20. Such operating parameters include, for example, the size of the item to be molded, the number of items to be molded per hour, the volume of material within the injector 14, extruder screw 58 speed, material temperature, pressure and flow rate settings for the various components, material cure times, injection rates, injector recharge rates, position of the mold S before, during and after the injection operation, injection pressure, lifting mechanism resistance pressure or separation force, stroke distances and the desired temperatures and pressures to be monitored in the operating components such as the hydraulic unit.

Based on the information provided to the control system 20, an automatic cycle can be developed to operate the apparatus 10 without operator intervention. Alternatively, the operator control panel 112 can be used to start and stop the apparatus between cycles, as may be necessary.

Once programming of the control system 20 is completed, a molding cycle is begun when the mold M is provided to the molding station 104 manually or via a transport system 24. The mold is then released from the transport system conveyor 105 and the lift mechanism 18 is operated to vertically raise the mold on the mold support 74 into engagement with the upper platen assembly 32 and nozzle 43. The mold support 74 of the lifting mechanism 18 engages the mold S with the upper platen assembly 32 with the force determined necessary to maintain the mold and position of the mold S during injection of the molding material.

The injector 14 then operates to inject material from the injector unit 42 into the mold, typically for approximately 3 to 4 seconds, when the material is within the temperature and pressure parameters discussed above. Molding material is injected from the internal cavity 50 in the injector unit 42 through the passage 49 in the nozzle holder 44, cylinder passage 126 and nozzle 43 to the runner plate 41. Once in the runner plate 41, material passes through the opening 120 to the second passageway 122 and openings 124, 125, into engagement with the sprue openings 54 to the internal mold cavity 52.

After injection is completed, the mold is released from engagement with the runner plate 41 of the upper platen assembly 32 and nozzle 43. Upon completion of injection, the shut-off valve 70 is actuated to the closed position to block flow of material to the nozzle 43. Recharging of the injector unit 42 may then be initiated. Recharging continues until the extruder 16 parameters are within the desired ranges discussed above. In the preferred embodiment, the recharging process lasts for approximately 4 to 5 seconds. Simultaneous with release of the mold, the transport system 24 operates to complete the molding cycle by moving the completed mold from the molding station 102 and providing a mold S for the next molding cycle. In the preferred embodiment of the apparatus, each cycle time is approximately 15 seconds.

The preferred form of the apparatus has been described above. However, with the present disclosure in mind it is believed that obvious alterations to the preferred embodiment, to achieve comparable features and advantages in other apparatus, will become apparent to those of ordinary skill in the art.

We claim:

1. A method of injecting molding material into a self-clamping mold comprising the steps of:
   supporting said mold in a support frame clamped in engagement with an injector using a lift mechanism,
   pre-determining the pressure required to inject material into said self-clamping mold and to be applied by said lifting mechanism to maintain the condition and position of said self-clamping mold during injection of molding material as a function of the area of exposed sprue openings in said self-clamping mold, transferring molding material into said injector, controlling the temperature of molding material transferred to said self-clamping mold, and injecting molding material into said self-clamping mold under said predetermined pressure using said injector while clamping said mold within said frame with a force of less than 25 tons using a lifting mechanism to maintain said mold condition and position.

2. The method as set forth in claim 1 further comprising the step of pre-determining the pressure required to inject molding material includes using a programmable computer for calculating and controlling the injection operation.

3. The method as set forth in claim 2 further comprising the step of transferring molding material to said injector comprises extruding material from an extruder.

* * * * *